(12) United States Patent
Dewees

(10) Patent No.: US 8,042,820 B1
(45) Date of Patent: Oct. 25, 2011

(54) DRIVER'S SIDE LARGE VEHICLE STEP

(76) Inventor: Thomas G. Dewees, Pleasanton, CA (US)

( * ) Notice: Subject to any disclaimer, the term of this patent is extended or adjusted under 35 U.S.C. 154(b) by 316 days.

(21) Appl. No.: 11/975,063

(22) Filed: Oct. 16, 2007

Related U.S. Application Data

(60) Provisional application No. 60/852,347, filed on Oct. 16, 2006.

(51) Int. Cl.
*B60R 3/02* (2006.01)
(52) U.S. Cl. ........................................................ 280/166
(58) Field of Classification Search .................. 280/848, 280/855, 163–165, 169; 182/88
See application file for complete search history.

(56) References Cited

U.S. PATENT DOCUMENTS

| | | | |
|---|---|---|---|
| 3,224,525 A | 12/1965 | Froitzheim et al. | |
| 3,329,443 A * | 7/1967 | Lowder et al. | 280/166 |
| 3,388,925 A | 6/1968 | Chavira et al. | |
| 3,743,320 A | 7/1973 | Clark | |
| 3,751,068 A | 8/1973 | Green | |
| 3,756,622 A | 9/1973 | Pyle et al. | |
| 3,762,742 A | 10/1973 | Bucklen | |
| 3,784,227 A | 1/1974 | Rogge | |
| 3,807,758 A | 4/1974 | Rogge | |
| 3,833,240 A | 9/1974 | Weiler | |
| 3,861,713 A | 1/1975 | McKee | |
| 3,888,510 A | 6/1975 | Maske | |
| 3,912,298 A | 10/1975 | Humphrey | |
| 3,951,431 A | 4/1976 | Hopkins | |
| 3,961,809 A | 6/1976 | Clugston | |
| 3,980,319 A * | 9/1976 | Kirkpatrick | 280/166 |
| 4,020,920 A * | 5/1977 | Abbott | 182/19 |
| 4,071,260 A | 1/1978 | Marshall | |
| 4,106,790 A | 8/1978 | Weiler | |
| 4,159,122 A | 6/1979 | Stevens | |
| 4,161,997 A | 7/1979 | Norman | |
| 4,185,849 A | 1/1980 | Jaeger | |
| 4,200,303 A | 4/1980 | Kelly | |
| 4,217,971 A | 8/1980 | Rivinius | |
| 4,231,583 A * | 11/1980 | Learn | 280/166 |
| 4,251,179 A | 2/1981 | Thorley | |
| 4,264,084 A | 4/1981 | Telles | |
| 4,462,486 A | 7/1984 | Dignan | |
| 4,570,962 A | 2/1986 | Chavira | |
| 4,708,355 A | 11/1987 | Tiede | |
| 5,092,617 A | 3/1992 | Jones | |
| 5,137,294 A | 8/1992 | Martin | |
| 5,150,659 A | 9/1992 | Bickel | |
| 5,195,609 A | 3/1993 | Ham et al. | |
| 5,224,723 A | 7/1993 | Hatas | |
| 5,228,707 A | 7/1993 | Yoder | |
| 5,284,349 A | 2/1994 | Bruns et al. | |
| 5,342,073 A | 8/1994 | Poole | |
| 5,358,268 A | 10/1994 | Hawkins | |
| 5,375,864 A | 12/1994 | McDaniel | |

(Continued)

*Primary Examiner* — J. Allen Shriver, II
*Assistant Examiner* — Erez Gurari
(74) *Attorney, Agent, or Firm* — Thomas M. Freiburger

(57) ABSTRACT

A device is added to or built into a subject large vehicle, such as a large motorhome. The device provides for the driver's use either one or two retracting steps to facilitate the driver's entrance into or exit from the subject vehicle. Since these steps retract for travel, they are able to extend far enough beyond the side of the subject vehicle to allow the driver's weight to be directly above each step in stair step fashion rather than vertical ladder fashion. The device makes motorhome driver's side doors safer and more usable for less athletic people and the elderly.

15 Claims, 14 Drawing Sheets

U.S. PATENT DOCUMENTS

| | | | |
|---|---|---|---|
| 5,456,479 A | 10/1995 | Conger | |
| 5,513,866 A | 5/1996 | Sisson | |
| 5,538,265 A | 7/1996 | Chen et al. | |
| 5,584,493 A | 12/1996 | Demski et al. | |
| 5,660,405 A | 8/1997 | Campbell | |
| 5,687,813 A | 11/1997 | Bensch | |
| 5,876,051 A | 3/1999 | Sage | |
| 5,897,125 A | 4/1999 | Bundy | |
| 6,082,751 A | 7/2000 | Hanes et al. | |
| 6,149,172 A | 11/2000 | Pascoe et al. | |
| 6,179,312 B1 * | 1/2001 | Paschke et al. | 280/166 |
| 6,213,486 B1 * | 4/2001 | Kunz et al. | 280/166 |
| 6,264,222 B1 * | 7/2001 | Johnston et al. | 280/166 |
| 6,283,537 B1 | 9/2001 | DeVore | |
| 6,471,002 B1 | 10/2002 | Weinerman | |
| 6,655,706 B1 | 12/2003 | Murrell | |
| 6,659,484 B2 | 12/2003 | Knodle et al. | |
| 6,926,295 B2 * | 8/2005 | Berkebile et al. | 280/166 |
| 6,942,233 B2 | 9/2005 | Leitner et al. | |
| 7,234,716 B2 * | 6/2007 | Stevenson | 280/166 |
| 7,287,771 B2 * | 10/2007 | Lee et al. | 280/166 |
| 7,367,574 B2 * | 5/2008 | Leitner | 280/166 |
| 7,448,637 B2 * | 11/2008 | Parker | 280/166 |
| 7,513,520 B2 * | 4/2009 | Okuyama | 280/166 |
| 2007/0267842 A1 * | 11/2007 | Seibert et al. | 280/166 |

* cited by examiner

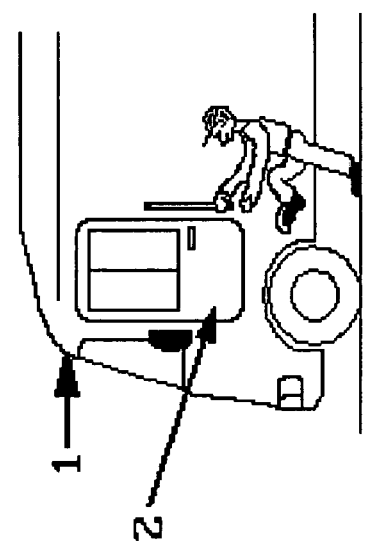
FIG. 1A — PRIOR ART
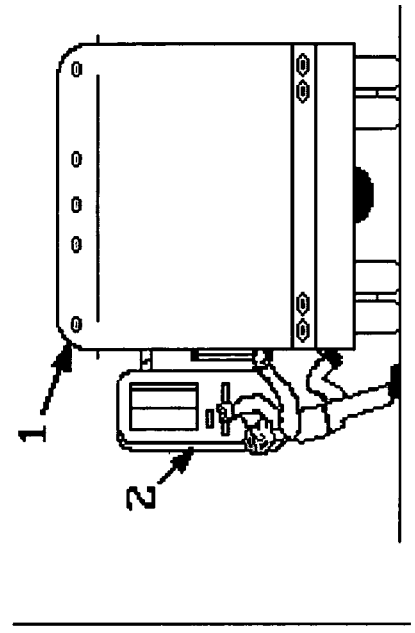
FIG. 1B
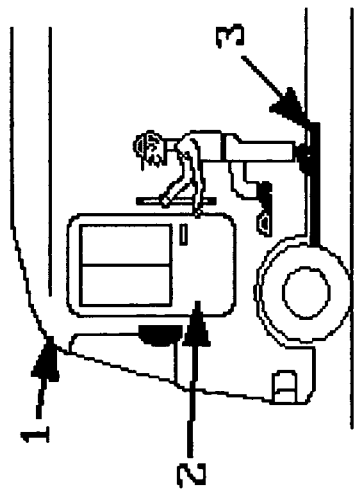
FIG. 1C
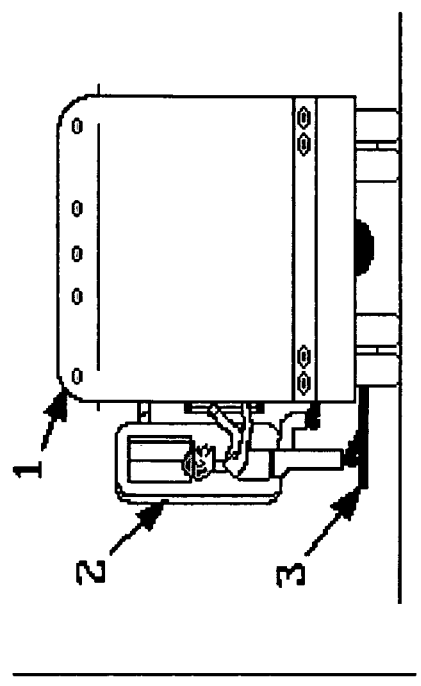
FIG. 1D

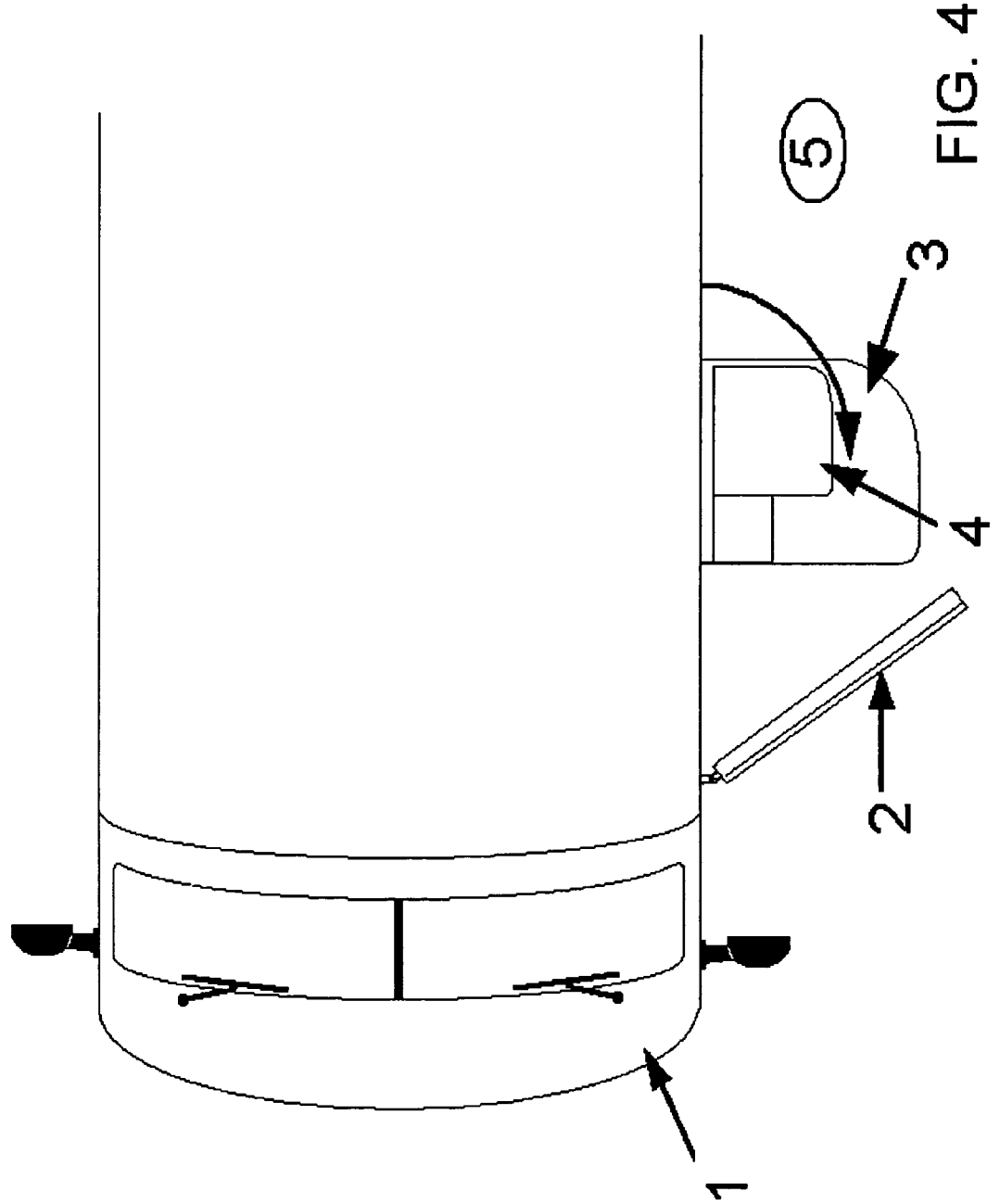

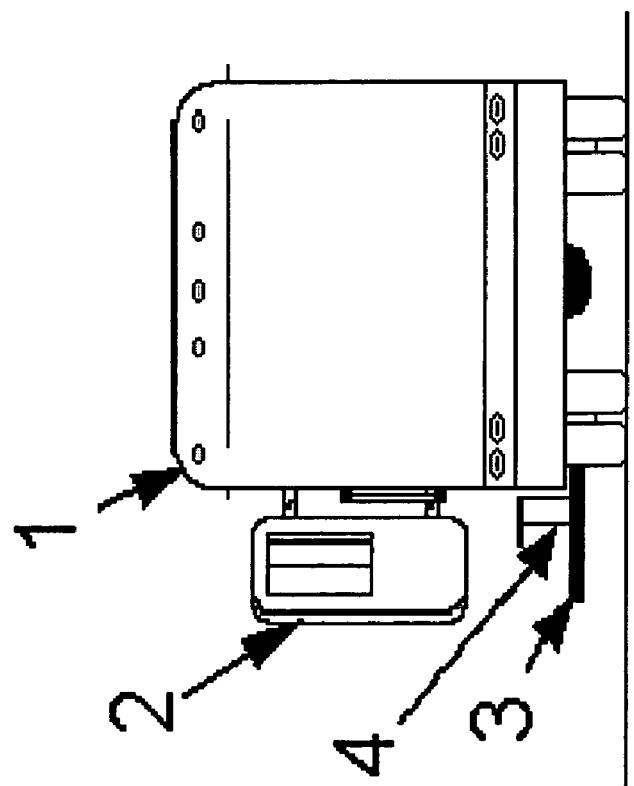
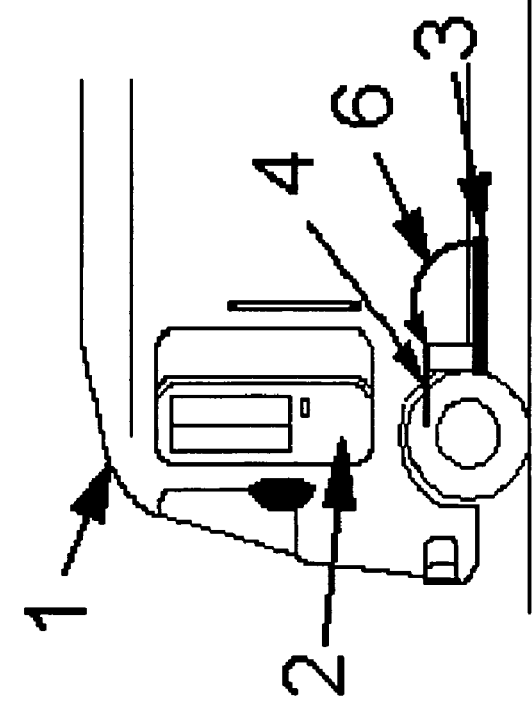
FIG. 6B
FIG. 6A

DRIVER'S SIDE LARGE VEHICLE STEP

This application claims benefit of provisional application No. 60/852,347, filed Oct. 16, 2006.

BACKGROUND OF THE INVENTION

The present invention relates to a retractable step system which can be built into a large vehicle such as a motorhome or retrofitted later. Although the system can be operated manually, the preferred method is to have the deployment of the steps be automatic, triggered by the opening and closing of the driver's door. The design of the retractable steps provides a place for the driver to step which extends far enough beyond the body of the vehicle to allow the driver to bring his/her full weight directly over the step before moving to the next step or into the vehicle. The specific design of the device provides for control of the rate of movement and the force behind each movement to avoid injury to anyone or anything in the path of the subject movement. It also provides for a positive locking of each step in place to provide secure footing for any person using it.

The need for the subject invention comes from the fact that, in many large vehicles such as a Class A motorhome the floor in the driver's area is often 3½ feet or more above the ground. Also in many of these large vehicles the driver sits nearly over the front wheel. It is impractical to employ a retractable step of the type commonly used in the middle of the passenger side on many Class A motorhomes, since it would have to be installed where the front wheel is located. The present invention, due to its rotary action, can rotate out from either in front of or behind the front wheel to provide a step or steps where needed. Some attempts have been made to solve this problem by building in a set of fixed steps for the driver similar to the classic bus entrance steps. However, this has proven difficult due to the presence of both the front wheel and the driver's controls. As a result, those manufacturers who provide a driver's side door on Class A motorhomes, do so as a "safety" measure, not as a convenient way into and out of the vehicle. However, even as an "emergency" exit these doors are not really safe for use by any but the most athletic person.

Typically manufacturers of "Class A" motorhomes equipped with driver's side doors have provided various types of pocket steps built into the side of the motorhome or various types of stirrup steps mounted in the wheel well area. Coupled with these are various grab bars and hand grips. However, considerable athletic ability is needed to get in and out of the vehicle using these devices. The main problem with these steps and/or stirrups is that a person attempting to go into or out of the vehicle using them must depend on arm strength to support much of the person's weight. Many people using motorhomes are not capable of doing this easily and safely. The present invention eliminates most or all of this requirement for arm strength. Also, the previous types of step devices are often hard to locate with a foot and are very easy to miss when the person is exiting the vehicle. This has resulted in injuries. The present invention solves this problem because the step or steps are clearly visible and readily accessible to the person exiting the vehicle.

Prior art includes a large variety of stirrups, pocket steps, grab handles and grab bars both inside and outside various vehicles, including motorhomes. For example, U.S. Pat. Nos. 6,179,312 (Paschke et al.) and 6,264,222 (Johnston et al.), both of which use a vertical pivot but are not shaft mounted. They both require major body design modifications and are therefore not suitable for retrofit to existing vehicles. The present invention is readily adaptable to retrofit to existing vehicles and vehicle design. These two patented devices are also designed primarily for use on truck cabs rather than motorhomes.

A number of other existing patents utilize a rotary motion to extend and retract a step from beneath the body of a vehicle. For example, U.S. Pat. Nos. 4,231,583 (Learn), 3,980,319 (Kirkpatrick), 4,708,355 (Tiede) and 3,762,742 (Bucklen), teach a step rotating on an inclined axis to place the step low to the ground when extended and clear the body lower edge when retracted. This limits the size of the step to not much more than a stirrup. An important aspect of the present invention is the large size of the step or steps which allows the person using them to have their weight fully centered over each step. Tiede also uses electric motor actuation rather than the air cylinder actuation employed in the present invention. Yet another rotary step patent (U.S. Pat. No. 5,897,125, Bundy) is a small treadle manually deployed to provide access at the side of a pick up truck bed.

Other patents which employ the concept of a step rotating out from under the vehicle body about a vertical axis are U.S. Pat. Nos. 3,329,443 (Lowder et al.), 6,283,537 (DeVore), 6,659,484 (Knodle et al.) and 3,861,713 (McKee), all teach a rotational step which retracts beneath the vehicle body but none of them apply to the driver's side door as does the present invention. Additionally, U.S. Pat. No. 3,388,925 (Chavira et al.) teaches a vertical shaft mounted step assembly to provide access to a loading dock and therefore differs from the present invention which provides access to and from the driver's side door.

The following list of prior patents presents a variety of step mechanisms which do not meet the requirements for an automatically deployed step assembly providing comfortable access to and from the driver's side door of a large motorhome for people of limited athletic ability as the present invention does. U.S. Pat. Nos. 6,942,233 (Leitner et al.), 6,655,706 (Murrell), 5,687,813 (Bensch), 5,660,405 (Campbell), 5,456,479 (Conger), 5,342,073 (Poole), 5,284,349 (Bruns et al.), 5,224,723 (Hatas), 5,195,609 (Ham et al.), 5,150,659 (Bickel), 5,137,294 (Martin), 5,092,617 (Jones), 4,264,084 (Telles), 4,251,179 (Thorley), 4,217,971 (Rivinius), 4,200,303 (Kelly), 4,185,849 (Jaeger), 4,106,790 (Weiler), 3,912,298 (Humphrey), 3,833,240 (Weiler), 3,807,758 (Rogge), 3,756,622 (Pyle et al.), 3,743,320 (Clark) and 3,751,068 (Green).

DESCRIPTION OF THE DRAWINGS

FIGS. 1A to 1D show views of a person entering a large vehicle, a motorhome. FIGS. 1A and 1B, labeled "PRIOR ART", show the degree of difficulty experienced by a person entering or exiting such a vehicle. FIGS. 1C and 1D, labeled "Using present invention", demonstrate the improvement using the present invention, a driver's side step in its simplest preferred embodiment.

FIGS. 3A and 3B, show a person standing on the lower step preparing to step up onto the second step. FIGS. 3C and 3D show a person standing on the upper step preparing to step up into the vehicle.

FIG. 4 shows the present invention, a driver's side step in the preferred embodiment of FIGS. 3A-3D, as seen from directly overhead. The lower step is shown in the "extended" or "open" position with the upper step still in the "folded" position.

FIGS. 6A and 6B show the present invention as seen from the side and the rear. The motion used to unfold the second step from the retracted to the open position is illustrated.

DESCRIPTION OF PREFERRED EMBODIMENTS

The present invention embodies a device or system of devices which, when installed in or on a large vehicle, such as a Class A motorhome, having a interior floor in the driver's area which is a considerable distance, often three to four feet, above ground level, will greatly reduce the level of athletic ability required to enter or exit the subject vehicle through a driver's side door. Due to the width of such a subject vehicle, it is desirable and necessary for any device or devices such as those in the present invention to be retracted proximately within the limits of the subject vehicle body for travel on the highway. In the present invention, this retraction and extension of the device or devices used is accomplished by means of a rotary motion or motions. In all of the several preferred embodiments, this rotary motion is controlled automatically in response to opening and closing of the driver's side door. In all of the several embodiments, the location and orientation of the step surfaces when in the open or extended position allows the person using them to step onto, and bring their whole weight directly and completely above, the subject step surface in the manner in which they normally ascend or descend stairways.

The upper two views in FIGS. 1A and 1B illustrate the problem which the present invention addresses. Due to the necessity to keep any fixed stepping surface provisions such as stirrups or recessed step pockets, as illustrated here, proximately within the width limits of the subject large vehicle 1, a person entering or exiting the subject vehicle through the driver's side door 2 cannot place full weight directly above the supporting step surface. It is, therefore, necessary for the person to support some of their weight by using arms and hands holding onto whatever handhold, handle or object is available when entering or exiting the subject vehicle 1 through the driver's side door 2.

The lower two views, FIGS. 1C and 1D, illustrate the present invention in its simplest embodiment. As can be seen in both the side view and the rear view, the person has opened the driver's side door 2 of the subject vehicle 1 causing a step 3 to rotate out into the extended or open position. The person has stepped up onto the step 3 (which can be called a base step) and is able to stand comfortably with weight fully and directly above the step 3 without need to use arms to help support the person's weight; that is, the person stands with his center of gravity over the step.

FIGS. 1C and 1D show that the vehicle 1, a motorhome, has vehicle side panels P extending down alongside the front wheel, which may be essentially down to the center hub of the wheel, at both fore and aft of the wheel. The step 3 swings out from below the panel P, and does not amount to a structure that replaces a panel portion rear of the wheel, as in some truck step structures of the prior art.

Figure 2:
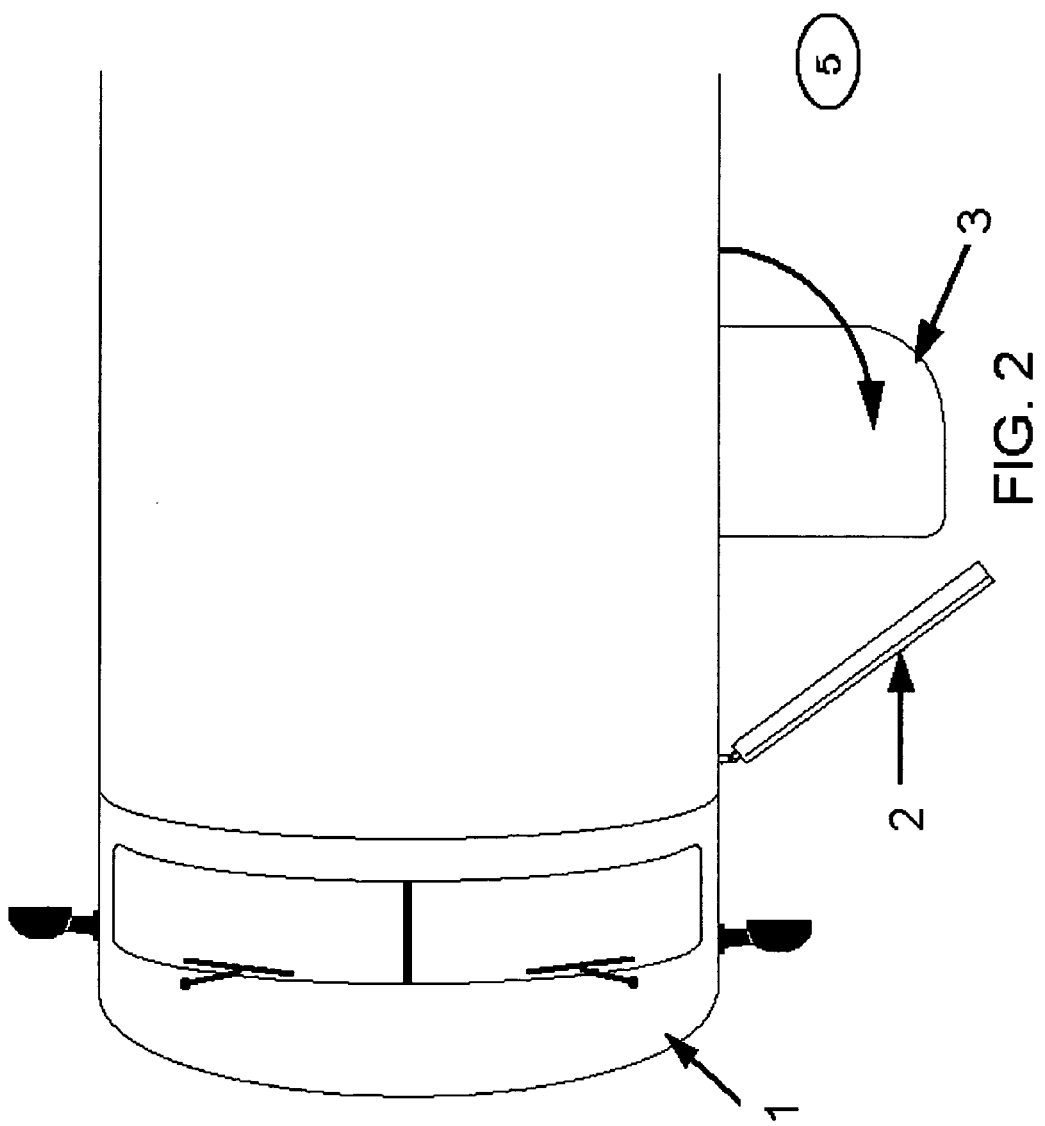
FIG. 2 shows the present invention, a driver's side step in its simplest preferred embodiment, as seen from directly overhead. The step is shown in the "extended" or "open" position.
Figure 3A:
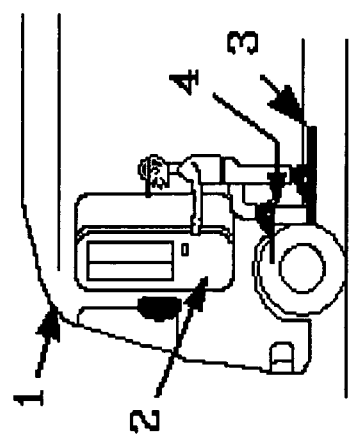
FIGS. 3A-3D show the present invention, a driver's side step in another preferred embodiment in which a second step is added to the embodiment shown in FIGS. 1A-1D and FIG. 2.
Figure 3C:
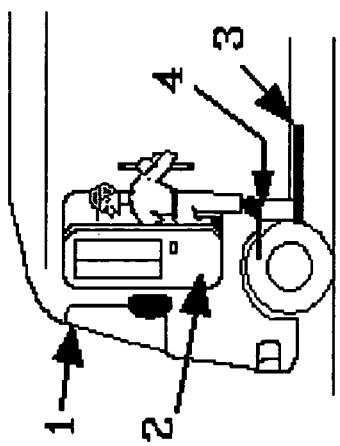
Figure 3B:
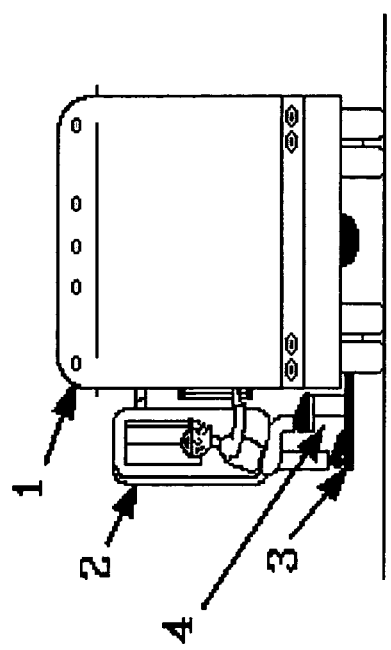
Figure 3D:
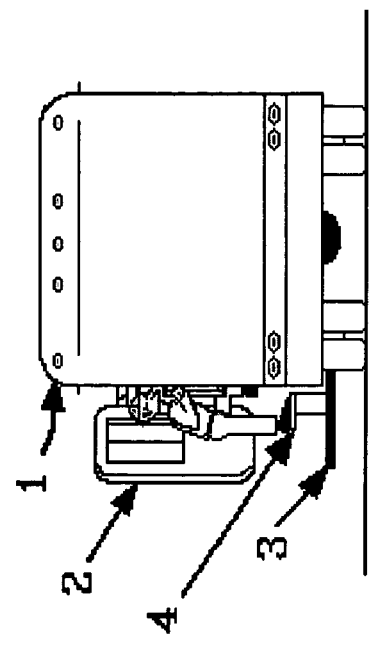

FIG. 2 further illustrates the present invention in its simplest embodiment showing a top view of the rotation of the step 3 from a retracted position into an extended position.

FIGS. 3-6 further illustrate the invention and its use in a two-step embodiment, to be described further below.

Figure 7:
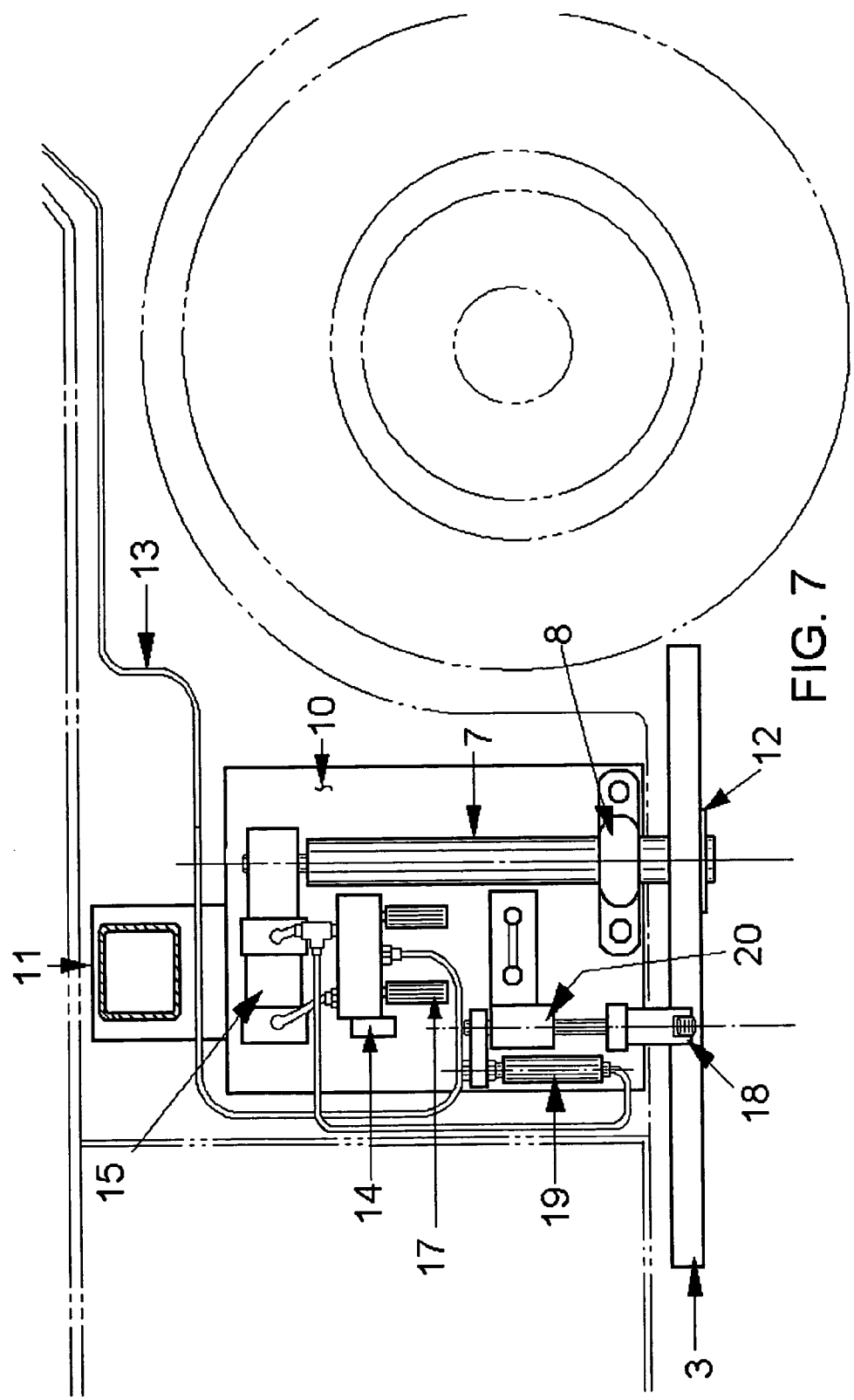
FIG. 7 shows the present invention, a driver's side step in the embodiment of FIG. 2, as seen in elevation from within the subject vehicle in cut away fashion. The step is shown in the "latched", "extended" or "open" position. A first preferred design of the preferred mechanism of the present invention is illustrated.

FIG. 7 further illustrates the present invention in its simplest embodiment showing a view from inside looking outward and toward the side of the subject vehicle. The first preferred mechanism of the simplest embodiment is shown. The step 3 is shown extended, although seen in edge view. The step 3 is shown mounted onto a rotary shaft 7 by means of a commercially available clamp 12. The shaft 7 is supported rotationally and axially by a lower bearing 8, mounted on a base plate 10 which is in turn mounted to and supported by a support frame member 11. The upper end of the shaft 7 is inserted into a commercially available pneumatic rotary actuator 15 which supports it rotationally and serves as a means of rotating the shaft 7 through an arc of 90 degrees, shown in FIG. 2 as Direction of Rotation 5, to move the step 3 from the retracted position to the extended position. This action occurs automatically in response to the opening the driver's side door 2 as illustrated in FIG. 2. In the preferred embodiment of the present invention, the opening the driver's side door 2 as illustrated in FIG. 2 actuates an electrical switch, preferably of the commercially available "proximity" or "limit" type, which closes an electrical circuit powered by the vehicle's electrical system and connected to the solenoid of a commercially available pneumatic valve 14. In the preferred embodiment the pneumatic valve 14 is of the solenoid actuated, spring return "four way valve" type. The valve 14 is piped to the rotary actuator 15 in an arrangement that causes the rotary actuator 15 to return the step 3 to the retracted position when the pneumatic valve 14 is in the spring return position. This ensures that in case of a loss of electrical power, the valve 14 will be set to the "retract" position. The electrical wiring to create the electrical circuit is readily achievable by anyone skilled in the art.

Figure 8:
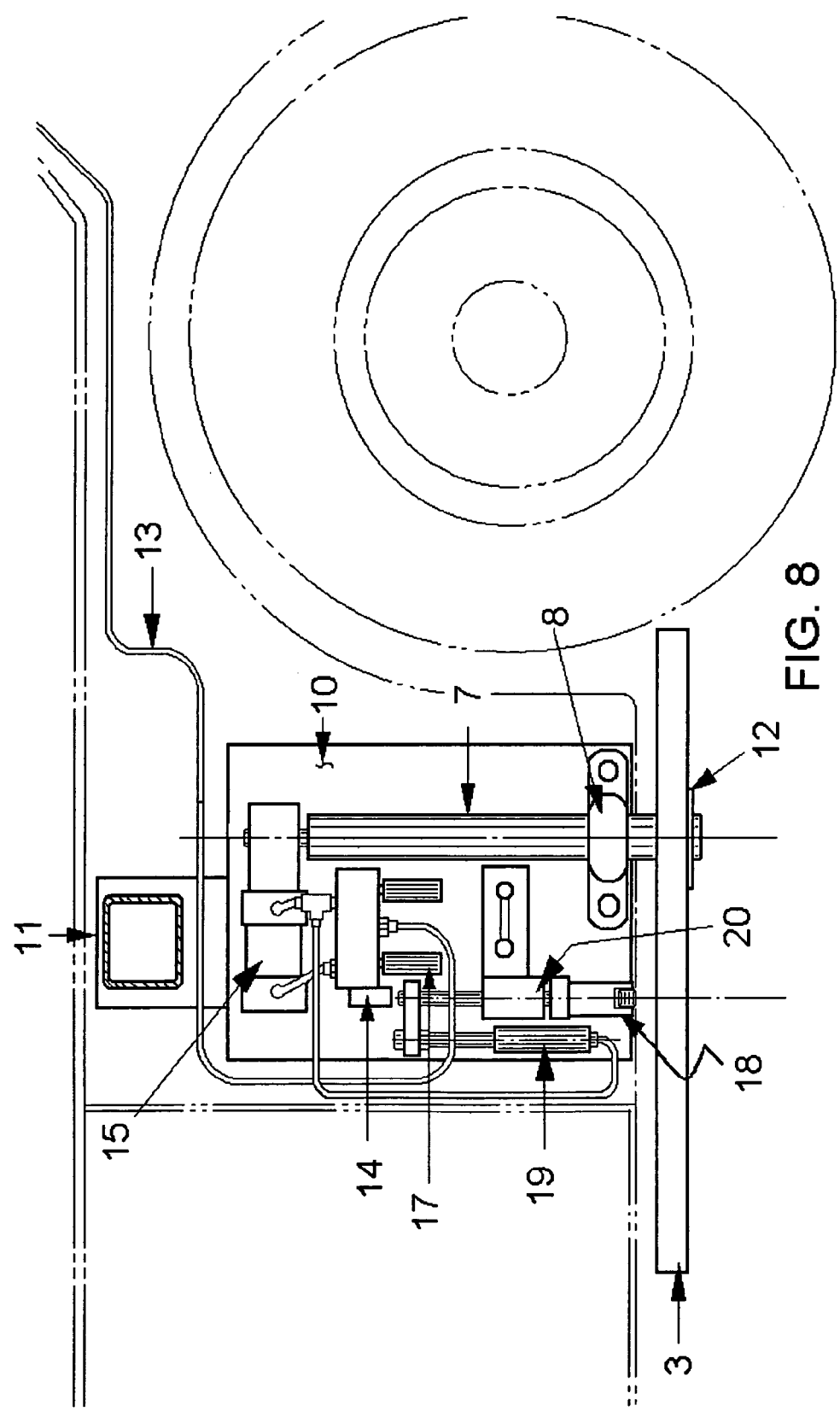
FIG. 8 shows the embodiment of FIG. 7 with the step in the "retracted" position.

Both the rotary actuator 15 and the pneumatic valve 14 are mounted on the base plate 10. Compressed air is delivered to the pneumatic valve 14 through an air pipe 13. The compressed air source can be any state of the art system, but the air pressure delivered to the pneumatic valve 14 must be regulated to provide enough driving torque to allow the rotary actuator 15 to rotate the shaft 7 and the step 3. However, for safety reasons, air pressure should not be so high as potentially to cause injury to a person in the path of the rotational motion of the step 3 as it moves from the retracted position to the extended position and vice versa. Good practice demonstrates that the pressure should be at or below the level that will cause the step 3 to exert a force of approximately five pounds or less at its outermost end. Also for reasons of safety, the preferred embodiment of the present invention includes the use of commercially available air flow rate controllers 17 on the exhaust ports of the pneumatic valve 15. These flow rate controllers 17 restrict the rate at which the compressed air exits the pneumatic valve 15. This in turn controls the rate of rotation of the shaft 7 and the step 3 caused by rotary actuator 15 as the step rotates from retracted to extended positions and vice versa. Good practice demonstrates that said rate of rotation should be at or below the rate that will cause the step 3 to take approximately 1.5 to 2 seconds to complete a 90 degree rotation. The limitation of compressed air pressure resulting in limited rotational torque applied to the step 3 necessitates that a means be provided to securely hold the step 3 in the extended position to avoid unsafe movement of the step 3 when stepped upon. Such a means to hold the step 3 is provided in the preferred embodiment by a latching plunger 18 illustrated in FIGS. 7, 8 and 9. The plunger 18 is mounted on the lower end of a pair of rods which run vertically through a mounting unit 20 which contains a pair of commercially available low friction linear bearings. The upper ends of the rods to which plunger 18 is mounted are in turn attached by a bracket to the cylinder rod of a commercially available spring return air cylinder 19. The air cylinder 19 is attached to the mounting unit 20. The spring return action of the air cylinder 19 applies a downward force to the plunger 18 when the air pressure is released when the valve 14 is in the extended position as shown in FIG. 7. The plunger 18 mounts a free turning roller on its lower end. The roller, on a horizontal axis, rolls on top of the step 3 while the step 3 rotates into the fully extended position. The plunger 18 rolls over the edge of the step 3 as the step 3 reaches its fully extended position and drops to the limit of its travel, pushed downward by the spring return action of air cylinder 19. In this fully extended position, the plunger 18 prevents any backward rotational movement in the retracting direction. When the valve 14 moves to the retract position in response to the driver's side door opening, compressed air is sent to the air cylinder 19 which exerts a force to raise the plunger 18. When the plunger 18 is raised so that the roller on its lower end clears the top of the step 3, the step is free to back into its retracted position as shown in FIG. 8.

Figure 9:
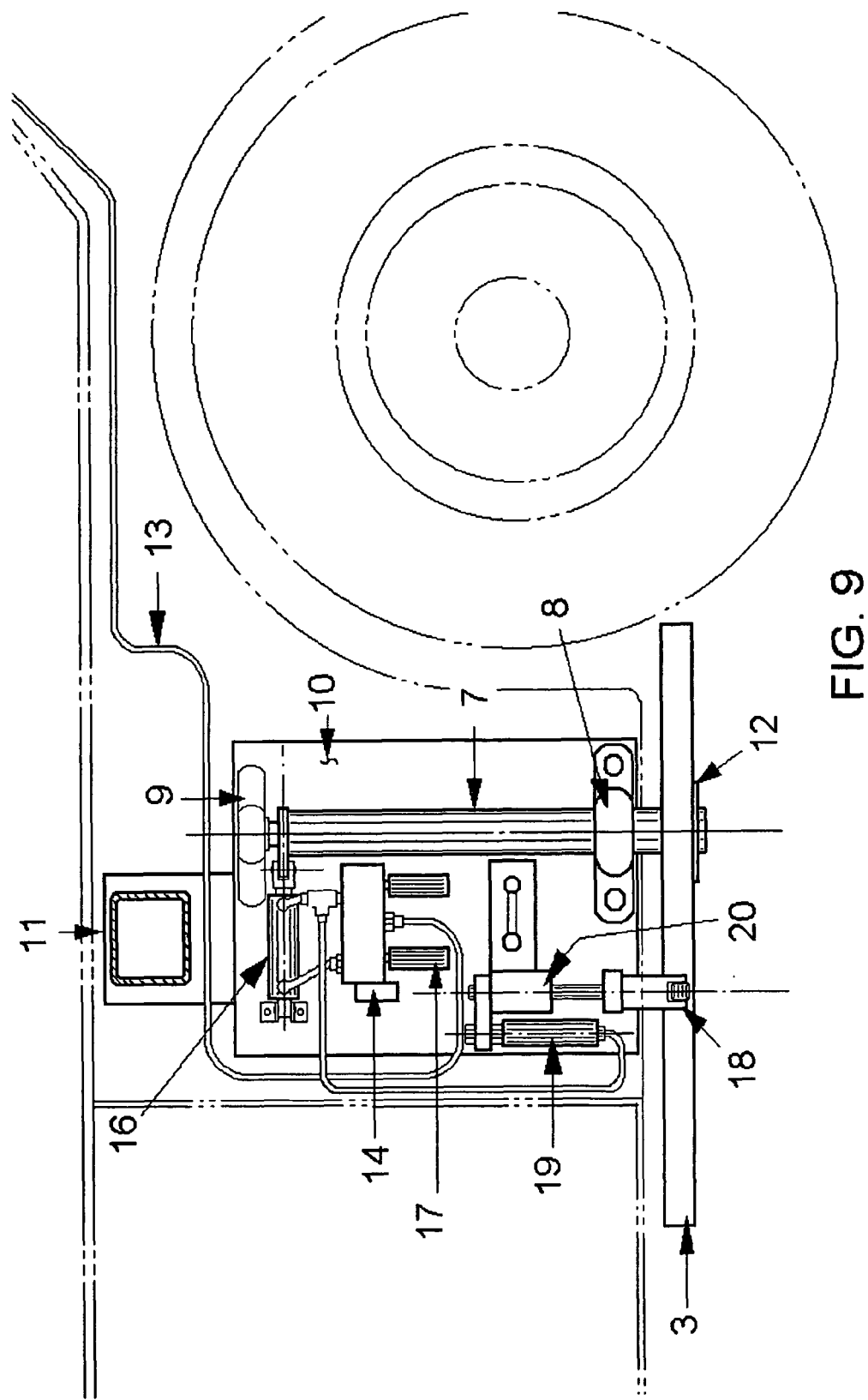
FIG. 9 shows the embodiment of FIG. 7 with a second preferred design of the mechanism of the present invention. The step is shown in the "latched", "extended" or "open" position.

Another preferred mechanism of the simplest embodiment of the present invention is shown in FIG. 9. This embodiment is identical the embodiment shown in FIG. 7 and FIG. 8 with the exception of the substitution of a commercially available air cylinder 16 connected to a lever mounted to the shaft 7 and the addition of a commercially available bearing 9 supporting the upper end of shaft 7. The bearing 9 and the air cylinder 16 are suitably mounted to the back plate 10. The full extension of the cylinder 16 causes the shaft 7 to rotate 90 degrees causing the step 3 to go from the extended position to the retracted position.

Figure 5:
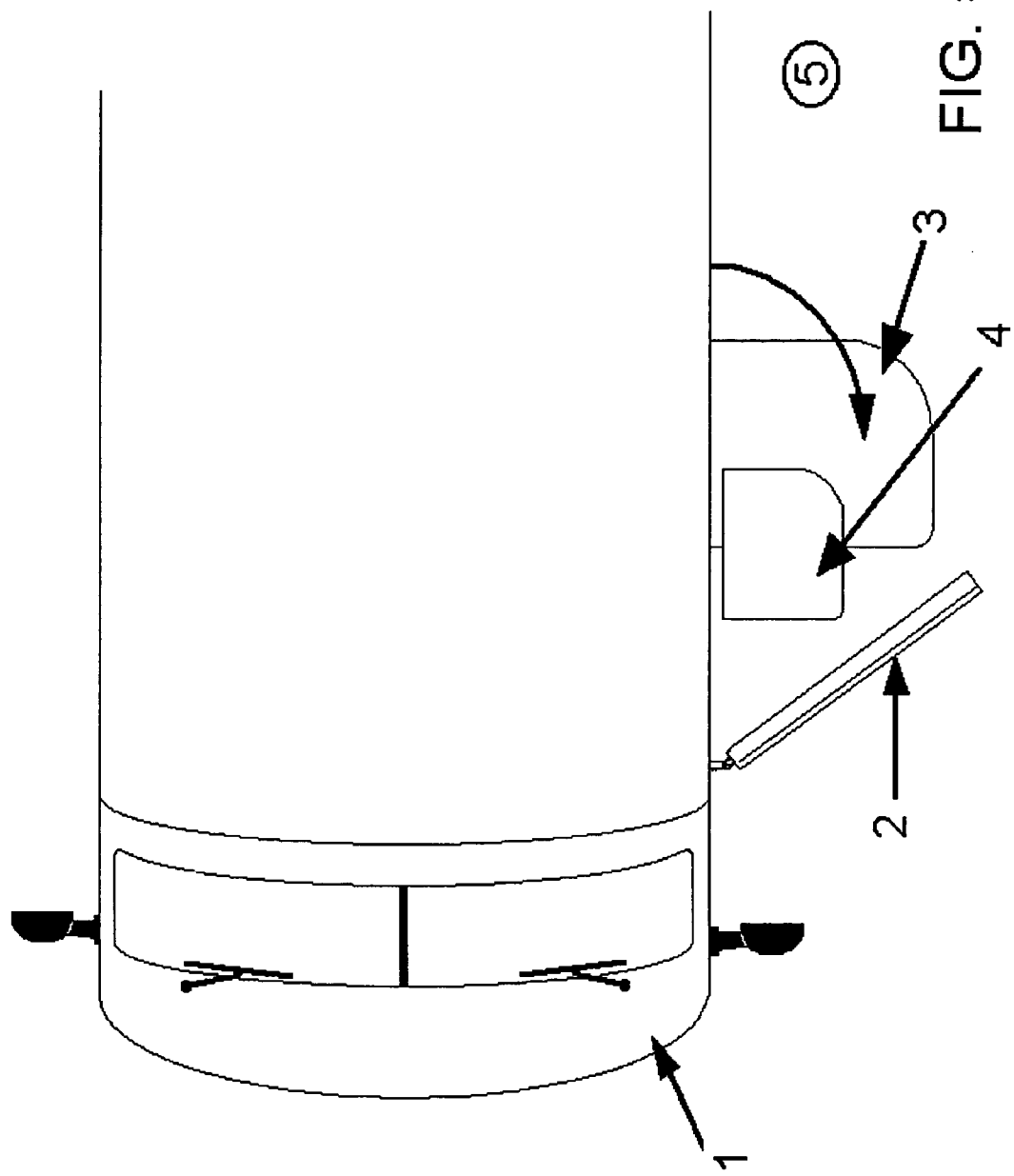
FIG. 5 shows the present invention, a driver's side step in the embodiment of FIGS. 3A-3D, as seen from directly overhead. The lower step is shown in the "extended" or "open" position with the upper step also in the "extended" or "open" position.
Figure 11:
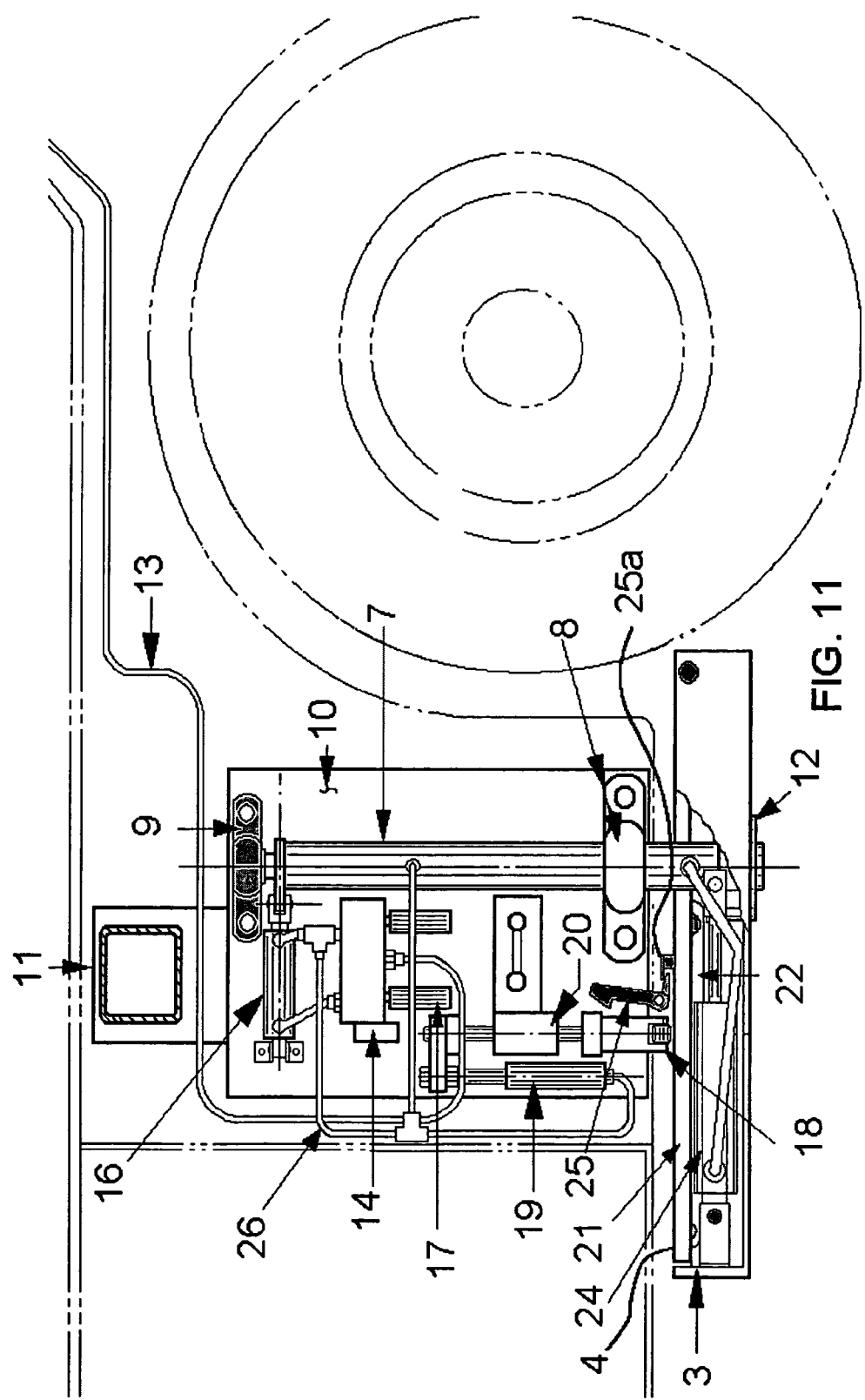
FIG. 11 shows the embodiment of FIG. 10 with the second step retracted and the secondary latch unlatched.

A second preferred embodiment of the present invention is shown in FIGS. 3A-3D in which a second or upper step 4 is added to the single lower step 3 of the simplest preferred embodiment shown in FIGS. 1C and 1D. This upper step 4 seen in FIGS. 3, 4 and 5 unfolds with motion 6 seen in FIGS. 6A and 6B from the step 3 referred to in the first embodiment when the first step 3 reaches its fully extended or open position as shown in FIG. 4. In its open or extended position, the second step 4 provides a step surface which preferably is approximately mid way between the first step 3 and the subject vehicle floor level and extending laterally well beyond the vehicle body 1 in similar fashion to the first step 3 as shown in FIG. 5. Thus, the person can stand on this step without being off balance as shown in FIGS. 1A and 1B. The second step 4 folds back down into or onto the first step 3 before the first step 3 returns to the retracted position. In the preferred form of this second embodiment of the present invention the second step 4 and its support mechanism is in the form of a parallelogram as seen from the side in FIG. 12 with pivoting means at all four intersectional points of the parallelogram. A spring preferably of the torsion type located at the lower pivot points of one or more of the pivotal members 22 provides the means to rotate the subject second step 4 into the extended or open position in the manner 6 shown in FIG. 6A. An air cylinder 24 located in the first step 3 assembly provides the means to rotate the second step 4 from the extended or open position back to the retracted position. Compressed air is supplied from the valve 14 to the air cylinder 24 through the shaft 7 which is bored and tapped for this purpose as shown in FIG. 11.

Figure 10:
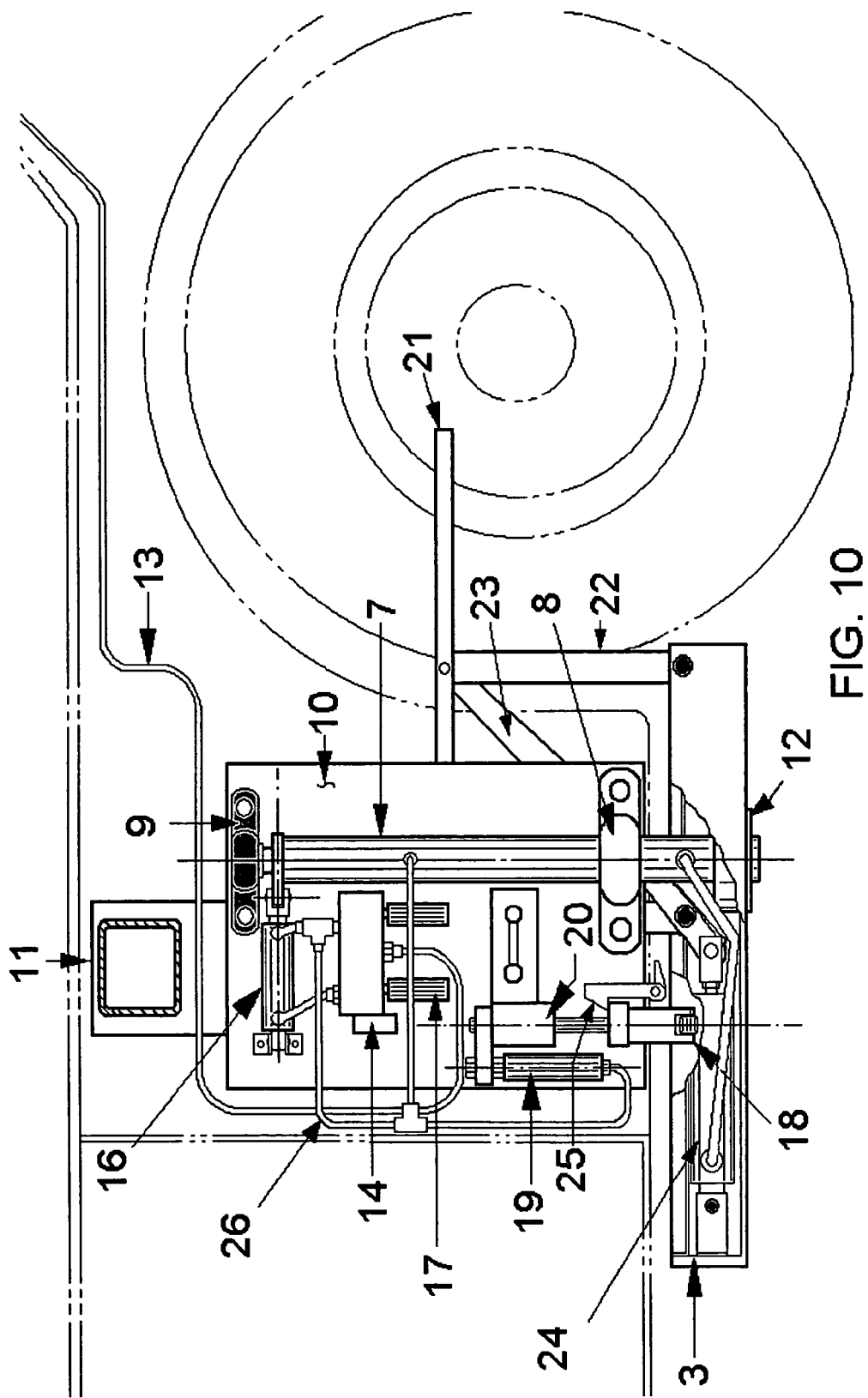
FIG. 10 shows the embodiment of FIGS. 3A-3D, again in elevation view, with a third preferred design of the mechanism of the present invention. Both steps are shown in the "latched", "extended" or "open" position. A secondary latch is illustrated securing the latching plunger in the "latched" position.
Figure 12:
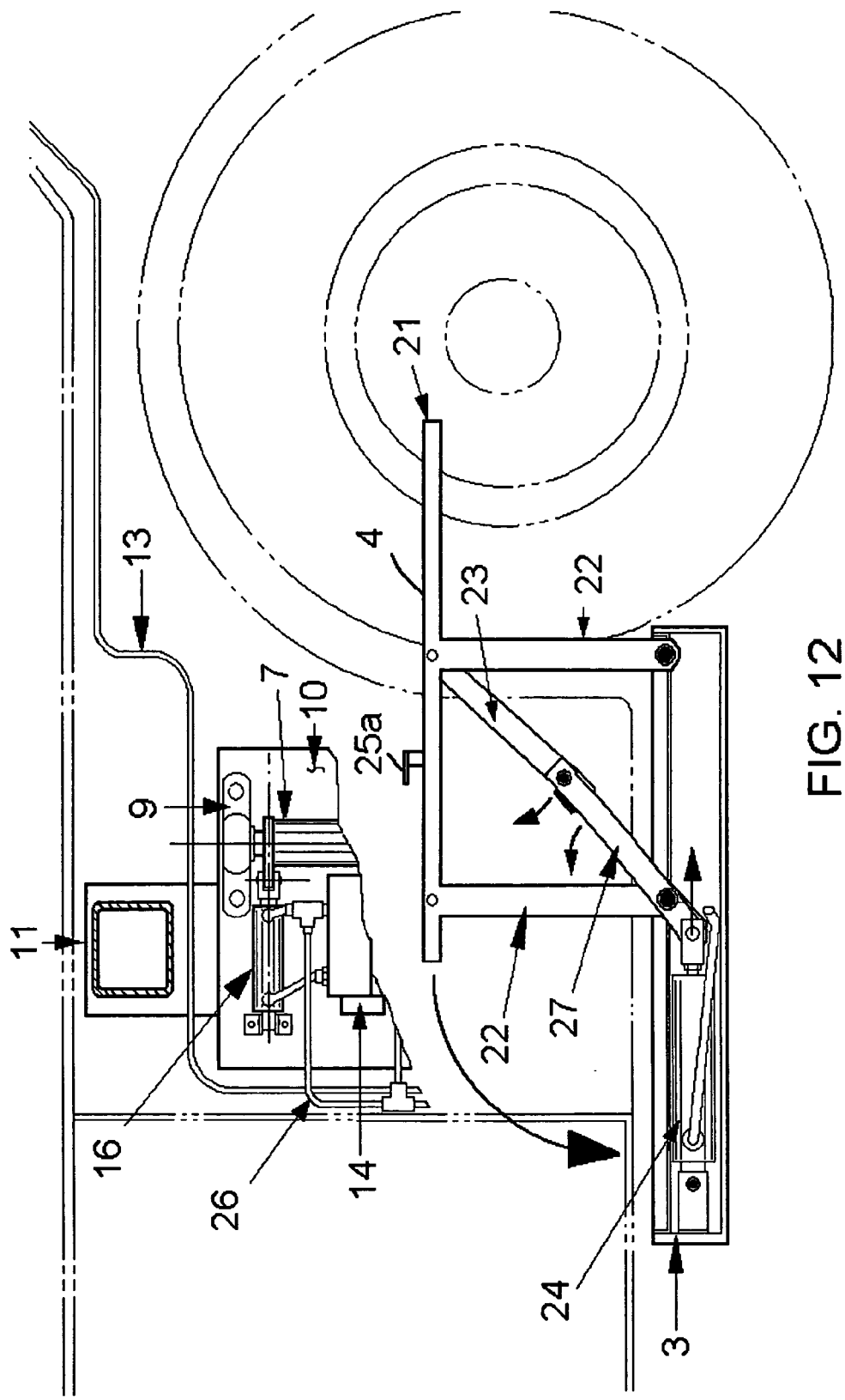
FIG. 12 shows the embodiment of FIG. 10 in cut away elevation view showing "over center" locking members which secure the second step in the "extended" or "open" position.
Figure 13:
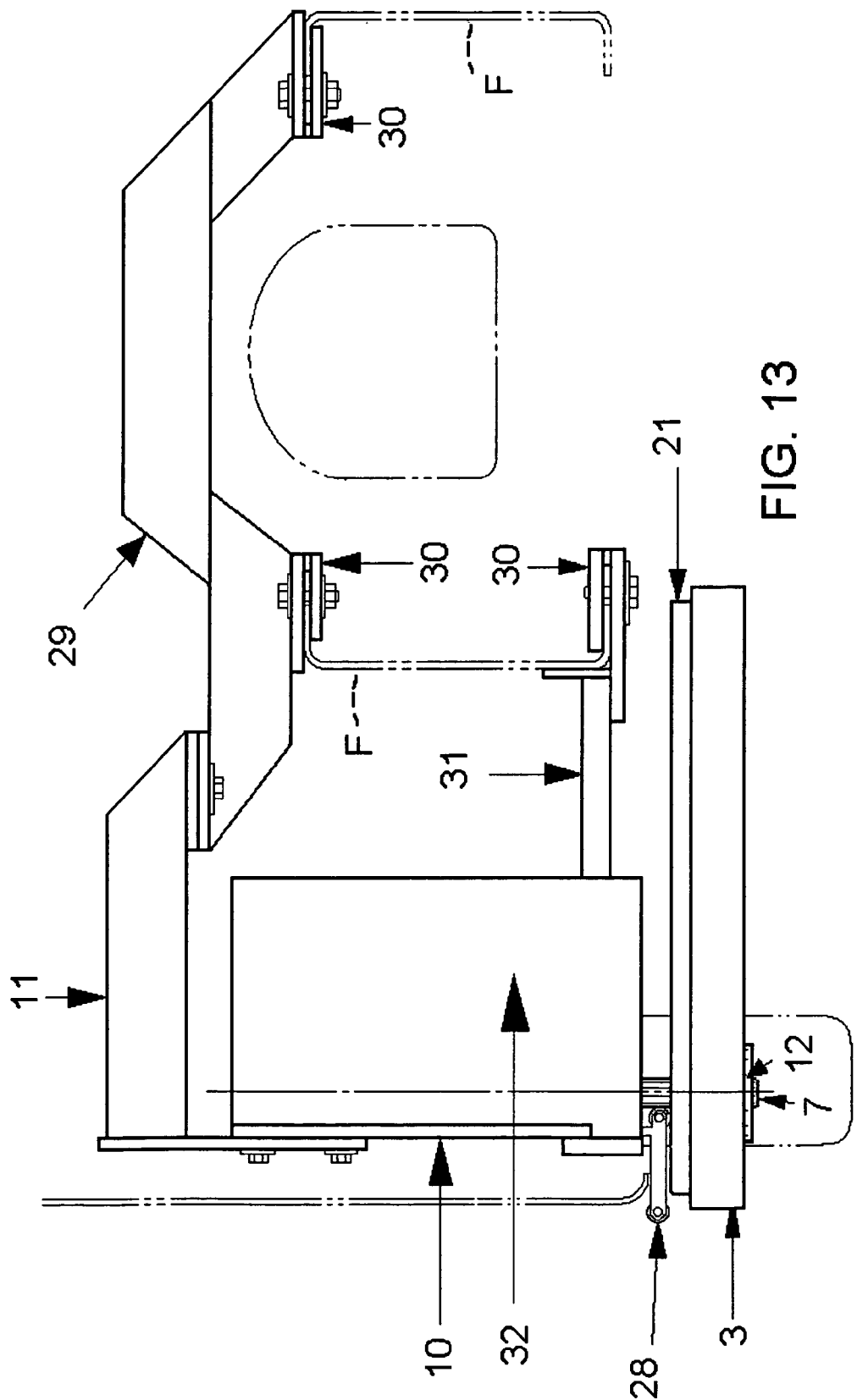
FIG. 13 shows the embodiment of FIG. 10 in a cut away transverse elevation view from the rear as seen from inside the subject vehicle. Both steps are shown retracted. The rollers that restrain the opening of the second step are shown. Also a preferred design of a mounting to attach the invention to a vehicle is shown. A dust shroud is shown in place as well.

In the preferred form of the subject second embodiment, when the extension of the subject steps is initiated by the opening of the driver's side door 2 as shown FIG. 4, the second step 4 is prevented from opening into the extended position by one or more free turning rollers 28, shown in FIG. 13, positioned and fixedly mounted to hold the subject second step 4 down until the first step 3 has reached its fully extended and latched position. At this point, having passed clear of the subject rollers 28, the second step 4 is free to swing up into its extended position in response to the pressure of the spring action exerted on members 22 seen in FIG. 12 (springs not shown). Also at this point the latching plunger 18, which secures the first step 3 in its extended position is itself prevented form retracting by a secondary latch 25 as shown in FIG. 10. When closure of the driver's door 2 triggers the retraction sequence, full retraction of the second step 4, as shown in FIG. 11, releases this subject secondary latch 25 via a catch 25a secured to the second step 4 as seen in FIGS. 11 and 12. This in turn allows the latching plunger 18 to retract which further allows the first step 3 to return to the retracted position.

Also in the preferred form of the subject second embodiment of the present invention, when the second step 4 reaches full extension in the extended mode (FIG. 12), one or more pairs of pivotally mounted and joined longitudinal members 23 and 27 are propelled into an over-center position in relation to each other by a means such as a torsion spring (not shown) at the joining of the subject members 23 and 27. The distal ends of the subject members are pivotally attached to diagonally opposed corners of the parallelogram formed by the second step 4, its support members 22 and the first step 3. Thereby the subject members 23 and 27 rigidly lock the second step 4 in position so long as they remain in the over-center relation each to the other. When the retract action is initiated by the driver's door closure, the air cylinder 24 mounted in the step assembly, which retracts the second step 4, moves the subject over-center members 23 and 27 out of the over-center position by its initial movement before continuing to retract the second step 4 with the remainder of its stroke as can be seen from FIG. 12

Another preferred part of both embodiments of the present invention is a mounting means which does not require any drilling, welding, or other modifications to the subject vehicle.

FIG. 13 shows schematically one preferred mounting means consisting of a structural member 11 bolted to the backing plate 10 and a main structural member 29 on its other end. The main structural member 29 is rigidly clamped to the vehicle frame F by clamping plates 30. Additional stability and rigidity is provided by a lower brace member 31 which is also clamped to the subject vehicle frame F using clamping plates 30. FIG. 13 also illustrates a sheet metal dust cover 32 provided to keep road dirt thrown up by the vehicle wheels from getting into the mechanism. It should be understood that the step mechanism can be mounted in other ways to the vehicle, such as by bolting to the vehicle frame, if desired.

In other embodiments of the present invention, although for obvious reasons the step surfaces on which the person entering or exiting the subject vehicle steps should be approximately horizontal, the axis of rotation or shaft 7 need not be approximately vertical. In fact, in some applications of the present invention, the axis of rotation will need to be inclined at a suitable angle to the vertical and may not even be a physical shaft. The axis of rotation can be virtual in nature formed by two or more bearings so located and mounted as to form the desired axis of rotation around which the subject base step 3 or step assembly 3 and 4 is rotated from the retracted position to the extended position and back to the retracted position.

Figure 14:
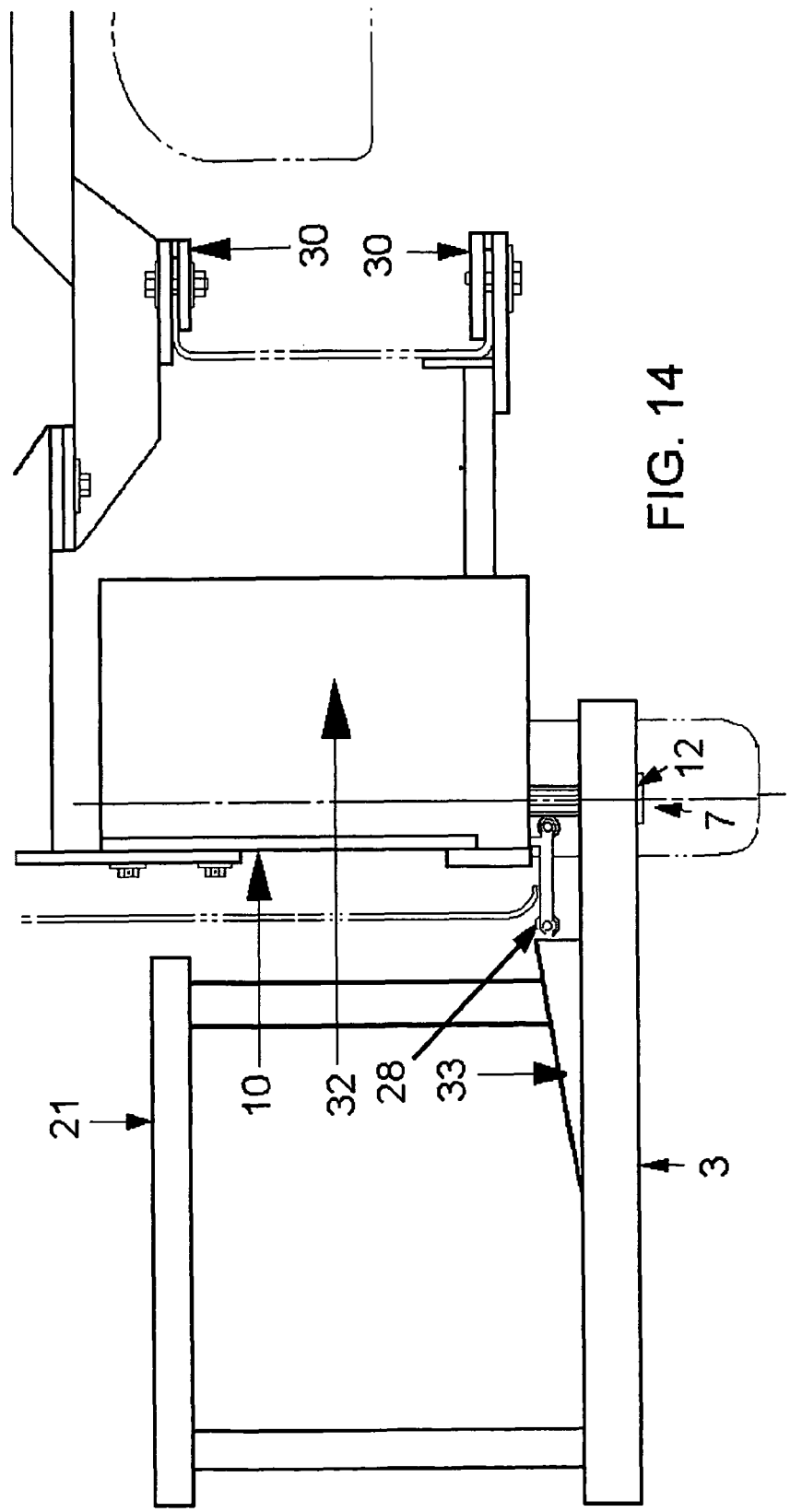
FIG. 14 is a view similar to FIG. 13 but with steps extended and with a modified latch device.

FIG. 14 shows yet another embodiment of the invention with modified step latching. The function of the latching plunger 18 and the secondary latch 25 shown in FIG. 10, which is to prevent retraction of the first step 3 before the second step 21 is fully retracted, is replaced by a spring actuated stop 33 pivotally mounted in the first or base step 3. When the first step 3 reaches the fully extended position in response to the opening of the driver's side door, the second step 21 is clear of the rollers 28 and begins to rise into its vertically extended position. This action of the second step 21 releases the spring actuated stop 33 to rise in response to its spring force to the position shown in FIG. 14 directly in line with and in contact with the roller 28. This action holds the first step 3 firmly in its fully extended position until the spring actuated stop 33 is pushed back down into its retracted position by the full retraction of the second step 21. This occurs, as explained above, in response to the closing of the driver's side door 2 or in response to cancellation of the opening action or other loss of electrical power to the driver's side step system.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. On a large vehicle with a driver's door high above the road surface and generally above a front vehicle wheel having a center hub, and the vehicle having fixed side panels extending down alongside the front vehicle wheel and below the top of the wheel both fore and aft of the wheel, a swing-out step for use by a person entering the driver's side door, comprising:
    a base step which is generally flat and horizontal at least at an upper surface of the base step,
    a pivotal mounting for the step on a vertical shaft mounted on the vehicle and connected to the step so as to move the step in a horizontal plane from a retracted position stored generally under the vehicle to an extended position swung laterally out from the vehicle, from just under a bottom edge of the side panel of the vehicle, to a base or first step level lower than the center hub of the front vehicle wheel, the shaft being the sole source of support for the step such that the step in the extended position is cantilevered from the shaft, and the extended position of the base step being sufficiently extended out from the vehicle that a driver can stand on the base step with the center of gravity of the driver directly above the step,
    step deploying means associated with the driver's door for causing the shaft to rotate to swing the step outwardly to the extended position when the driver's door opens and to swing the step back inwardly to the retracted position when the driver's door closes, and
    a latch positioned to hold the step in the extended position until the door is closed.

2. The apparatus of claim 1, wherein the latch comprises a plunger movable downwardly to hold a back edge of the base step from swinging inwardly toward the vehicle.

3. The apparatus of claim 1, including pneumatic actuation of the generally vertical shaft to swing the base step out to the extended position.

4. The apparatus of claim 3, wherein the pneumatic actuation includes a spring return for returning the base step to the retracted position.

5. The apparatus of claim 4, wherein the spring return is pneumatic.

6. The apparatus of claim 1, wherein the extended position of the base step is about 90° out from the retracted position.

7. The apparatus of claim 1, wherein the swing-out step is supported from a frame of the vehicle.

8. The apparatus of claim 1, wherein the large vehicle is a Class A motorhome.

9. On a large vehicle with a driver's door high above the road surface and generally above a front vehicle wheel having a center hub, and the vehicle having fixed side panels extending down alongside the front vehicle wheel and below the top of the wheel both fore and aft of the wheel, a swing-out step for use by a person entering the driver's side door, comprising:
    a base step which is generally flat and horizontal at least at an upper surface of the base step,
    a pivotal mounting for the step on a vertical shaft mounted on the vehicle and connected to the step so as to move the step in a horizontal plane from a retracted position stored generally under the vehicle to an extended position swung laterally out from the vehicle, from just under a bottom edge of the side panel of the vehicle, to a base or first step level lower than the center hub of the front vehicle wheel, the shaft being the sole source of support for the step such that the step in the extended position is cantilevered from the shaft, and the extended position of the base step being sufficiently extended out from the vehicle that a driver can stand on the base step with the center of gravity of the driver directly above the step,
    step deploying means associated with the driver's door for causing the shaft to rotate to swing the step outwardly to the extended position when the driver's door opens and to swing the step back inwardly to the retracted position when the driver's door closes, a latch positioned to hold the base step in the extended position until the door is closed, and a second step connected to the base step, storable on the top of the base step when the base step is retracted and deployable to an upward position automatically when the driver's side door is open and the base step is swung out to the extended position.

10. The apparatus of claim 9, wherein the second step includes a mechanism comprising essentially a parallelogram of pivoted link members connected to a second step surface such that the second step surface swings upwardly and forwardly from a stored position against the top of the base step to an extended position raised above the base step and positioned forwardly of at least a portion of the base step so as to be in an extended position between the base step and the driver's door of the vehicle.

11. The apparatus of claim 10, including springs biasing the second step toward the upwardly raised, extended step position, and a pneumatic cylinder connected to retract the second step to the retracted and stored position against the base step, the pneumatic cylinder being activated when the driver's side door is closed.

12. The apparatus of claim 9, wherein the latch comprises a spring actuated stop pivotally mounted in the base step and having a lowered position in the base step and a raised position extending upward from the base step, the raised position being effective to block the base step from retracting, and the spring actuation urging the stop upwardly such that when the base step swings out to the fully extended position the stop springs upwardly.

13. The apparatus of claim 12, wherein lowering of the second step contacts the spring actuated stop and is effective to push the stop back down into the base step and thereby to allow the base step and second step to be retracted.

14. The apparatus of claim 9, wherein the swing-out step is supported from a frame of the vehicle.

15. The apparatus of claim 9, wherein the large vehicle is a Class A motorhome.

* * * * *